United States Patent [19]

Stauber

[11] Patent Number: 4,558,909
[45] Date of Patent: Dec. 17, 1985

[54] AIR BEARING BODY

[75] Inventor: Siegfried T. Stauber, Zurich, Switzerland

[73] Assignee: Wyler AG., Switzerland

[21] Appl. No.: 592,345

[22] Filed: Mar. 20, 1984

[30] Foreign Application Priority Data

Mar. 30, 1983 [CH] Switzerland .......................... 1774/83

[51] Int. Cl.⁴ .......................... F16C 29/02; F16C 32/06
[52] U.S. Cl. ..................................... 308/5 R; 384/100; 384/123
[58] Field of Search ............... 308/5 R; 384/100, 121, 384/122, 123, 124, 112, 292, 305

[56] References Cited

U.S. PATENT DOCUMENTS

| 2,362,667 | 11/1944 | Schmidt | 384/305 |
|---|---|---|---|
| 3,232,680 | 2/1966 | Clark . | |
| 3,376,083 | 4/1968 | Muijderman | 384/123 |
| 3,377,113 | 4/1968 | Wilson | 384/100 X |
| 3,380,040 | 4/1968 | Liggett et al. | 384/100 X |
| 3,545,366 | 12/1970 | Bruhin | 308/5 R X |
| 3,841,720 | 10/1974 | Kovach et al. | 384/123 |

FOREIGN PATENT DOCUMENTS

| 2616918 | 10/1977 | Fed. Rep. of Germany | 384/112 |
|---|---|---|---|
| 3124166 | 2/1982 | Fed. Rep. of Germany . | |
| 1547132 | 11/1968 | France . | |
| 2337832 | 8/1977 | France . | |
| 549736 | 5/1974 | Switzerland . | |
| 794902 | 5/1958 | United Kingdom . | |
| 1265885 | 3/1972 | United Kingdom | 384/121 |

Primary Examiner—Stuart S. Levy
Assistant Examiner—Thomas R. Hannon
Attorney, Agent, or Firm—Roylance, Abrams, Berdo & Goodman

[57] ABSTRACT

An air bearing body has an air supply aperture opening in the center of a planar bearing surface. Shallow air circulation ducts extend spirally outwardly in the bearing surface from the air supply aperture balancing pressure in the air gap between the bearing surface and a mating bearing surface and preventing tilting forces on the bearing body. An annular air removal duct can surround the bearing surface and can be connected to a section line to contribute to the constancy of the height of the air gap between the bearing surface and a mating bearing surface.

7 Claims, 3 Drawing Figures

AIR BEARING BODY

FIELD OF THE INVENTION

The present invention relates to an air bearing body or box with a planar bearing surface and an air supply aperture opening in the center of the bearing surface.

BACKGROUND OF THE INVENTION

Air bearings permit contactless bearing or seating arrangements so that there is no wear and no significant bearing friction. In view of their characteristics, air bearings are advantageously used on the slide guides of measuring slides or carriages in coordinate measuring machines. The accuracy of the measuring slide movement and positioning depends on the height of the air gap between the bearing surface of the bearing body and the mating bearing surface of the slide guide. As far as possible, the height of the air gap must be kept constant. The constancy of the air gap height depends on the accurate regulation of the air supply pressure and the precision of the bearing surface finishes.

When using conventional air bearings, accurate guiding of a measuring slide requires that the measuring slide be mounted by air bearings receiving the slide guide in the direction of gravity, and by additional air bearings facing the slide in a direction opposite to gravity. In this manner, the measuring slide can be accurately guided by the cooperation of a plurality of bearings arranged in different loading directions.

To maintain an ideal state of equilibrium for the measuring slide, the quantity of air to each individual bearing must be controlled. The higher the air pressure used, the more stable or rigid the bearing. Without the cooperation of a large number of air bearings working in opposition, conventional air bearings provide an excessively imprecise or non-fixed working position due to an imprecise air gap height and position for the object to be set.

The working position of conventional air bearings can be displaced by minor imprecisions in the bearing surfaces. This occurs as a result of the air accumulating or stagnating due to the relative displacement movements between the bearing bodies and the mating surface of the slide guide when moving the measuring slide. This air accumulation causes tilting of the bearing resulting from a displacement of the central pressure point of the bearing.

SUMMARY OF THE INVENTION

An object of the present invention is to provide an air bearing body which obviates the aforementioned disadvantages of conventional air bearings.

Another object of the present invention is to provide an air bearing body producing a specific working point which can be precisely maintained.

The foregoing objects are obtained by an air bearing body comprising a planar bearing surface, an air supply aperture opening in the center of the bearing surface, and a plurality of shallow air circulation ducts opening on the bearing surface. The air circulation ducts extend along spiral paths from and in fluid communication with the aperture. Each air circulation duct has a transverse cross-sectional configuration with a relatively low height in a direction perpendicular to the bearing surface.

The air circulation ducts provide uniform air distribution in the air gap between the bearing surface of the air bearing and its mating surface. Possible imprecisions in the mating bearing surfaces, or any accumulation of air due to bearing movement parallel to the bearing surface, does not adversely influence positioning so that the rigidity of the bearing is increased.

The bearing rigidity can be further improved and the air gap between the bearing surfaces can be reduced by providing an air removal duct connected to a vacuum source, opening on the bearing surface and concentric to the air supply aperture. The combination of the overpressure and vacuum in the air bearing stabilizes the air flow through the bearing, and provides a more precise working point for the bearing and greater bearing rigidity. With air removal ducts in the air bearings, only a relatively few air bearings are required to guide a measuring slide precisely, and additional air bearings oriented in an opposite pressure direction are not necessary for an adequately rigid bearing or seating. Reducing the number of air bearings provides a considerable cost saving because bearing bodies with the required high degree of precision are expensive to manufacture.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE PREFERRED EMBODIMENTS OF THE PRESENT INVENTION

Figure 1:
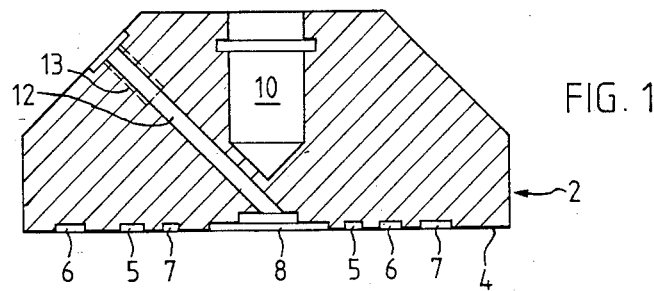
FIG. 1 is a side elevational view in section of an air bearing body according to a first embodiment of the present invention.

The bearing box or body 2 according to the first embodiment of the present invention illustrated in FIG. 1 differs from conventional air bearing bodies by air circulation ducts 5, 6, 7 provided in bearing surface 4. These ducts extend from a stepped, shallow air supply opening or aperture 8 outwardly along logarithmic spiral paths over arcs of at least 360°, and terminate at distances from the outer circumference of the bearing surface. The configuration of the air circulation ducts corresponds to that of the second embodiment illustrated in FIGS. 2 and 3. A central bore 10 can be used for coupling the bearing body to a member, e.g., a measuring slide of a multiple coordinate measuring machine which is to be mounted or seated. An air supply duct 12 passes angularly through bearing body 2 and ends in air supply aperture 8. An internal thread 13 is provided in duct 12 for connecting an air supply line or pipe.

Spiral air circulation ducts 5 to 7 uniformly distribute and direct the compressed air supplied by pipe 12 radially outwardly over bearing surface 4. An air gap of uniform or constant height is formed between bearing surface 4 and a mating bearing surface. Local pressure increases, e.g., due to defects in the mating bearing surfaces or an accumulation or stagnation effect when moving the bearing body parallel to the bearing surface plane, are immediately compensated by the air circulation ducts. The 360° arcuate extent of the ducts will ensure that a scratch damaging the bearing surface will connect all ducts maintaining uniform air distribution.

The height or depth of air circulation ducts 5 to 7 is illustrated on an enlarged scale in the drawings and is, for example, 0.02 mm measured in a direction perpendicular to bearing surface 4. The air circulation ducts in the bearing surface can be produced by etching.

Preferably, the area of the transverse cross-sectional configurations of the air circulation ducts increases radially outwardly, i.e., as distances from air supply aperture 8 increase, so that the air pressure in the ducts decreases in this direction, by increasing the transverse cross-sectional width and/or height. The increasing width increases distribution of air over the bearing surface, as well as reducing air pressure in the ducts. The radiation of air pressure in the radially outward direction causes the air to escape radially outwardly at a lower velocity, avoiding vibrations due to escaping air. To further reduce vibrations, the number of air circulation ducts is advantageously uneven. At least three such ducts are provided to stabilize the position of the bearing body.

Figure 2:
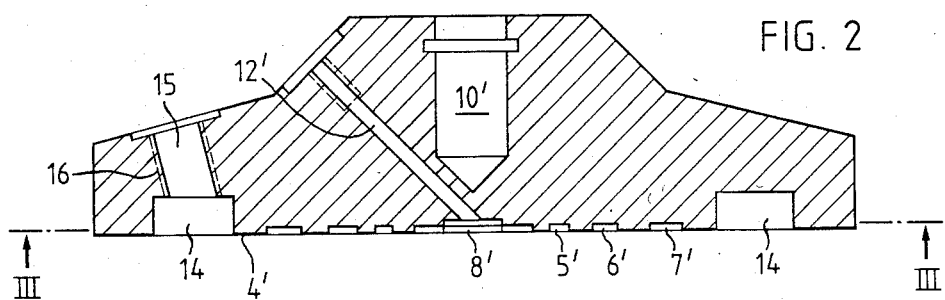
FIG. 2 is a side elevational view in section of an air bearing body according to a second embodiment of the present invention.
Figure 3:
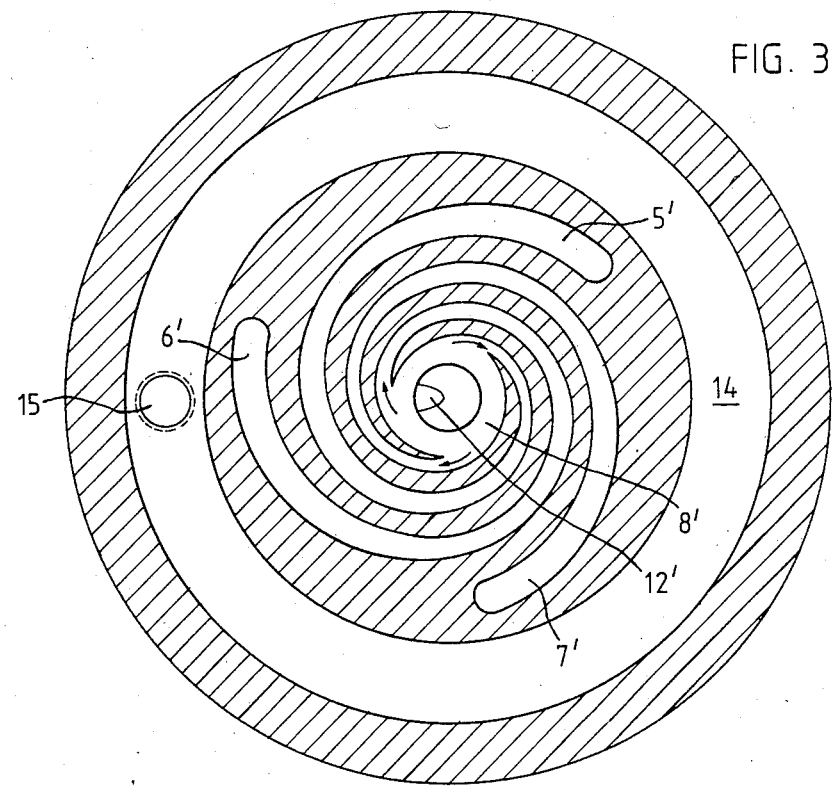
FIG. 3 is a bottom plan view in section of the air bearing body of the second embodiment taken along line III—III of FIG. 2.

The second embodiment illustrated in FIGS. 2 and 3 differs from the first embodiment of FIG. 1 by an air removal duct 14 surrounding and opening on bearing surface 4'. Duct 14 forms a suction or low pressure duct and is connected to a vacuum source by a duct 15 extending to the outside of the bearing body. An internal thread 16 in duct 15 is used for connecting a suction line coupled to the vacuum source. The parts in FIGS. 2 and 3 corresponding to parts of the first embodiment of FIG. 1 have the same reference numerals, followed by an apostrophe or prime.

The suction action of air removal duct 14 acts in opposition to the pressure action of the compressed air supplied through duct 12 and flowing across bearing surface 4. The combined pressure and suction actions form a narrow air gap, while maintaining the high load carrying capacity of the bearing. The bearing body of FIGS. 2 and 3 is particularly suitable for precision bearings.

While various embodiments have been chosen to illustrate the invention, it will be understood by those skilled in the art that various changes and modifications can be made therein without departing from the scope of the invention as defined in the appended claims.

What is claimed is:

1. An air bearing for slide guides, comprising:
    a non-rotatable body including a planar bearing surface having a center portion and an outer periphery;
    an air supply aperture opening on said center portion of said bearing surface for supplying air pressure from an external source to said bearing surface; and
    a plurality of shallow air circulation ducts opening on said bearing surface, an uneven number of said ducts being provided, said ducts extending along spiral paths with spiral arcs of at least 360° from and in fluid communication with said aperture, each of said ducts having a transverse cross-sectional configuration with a relatively low height in a direction perpendicular to said bearing surface and having an end spaced at a distance from said outer periphery of said bearing surface, said transverse cross-sectional configuration of each of said air circulation ducts having an area which increases with increasing distance from said air supply aperture.

2. An air bearing according to claim 1 wherein said spiral paths are logarithmic spirals.

3. An air bearing according to claim 2 wherein an air removal duct opens on said bearing surface and is concentric with said air supply aperture, said air removal duct having means, in fluid communication therewith, for coupling said air removal duct to a vacuum source.

4. An air bearing according to claim 2 wherein said height of said air circulation ducts is at least approximately 0.02 mm.

5. An air bearing according to claim 1 wherein an air removal duct opens on said bearing surface and is concentric with said air supply aperture, said air removal duct having means, in fluid communication therewith, for coupling said air removal duct to a vacuum source.

6. An air bearing according to claim 1 wherein said height of said air circulation ducts is at least approximately 0.02 mm.

7. An air bearing according to claim 1 wherein said transverse cross-sectional configuration of each of said air circulation ducts has a width which increases with increasing distance from said air supply aperture.

* * * * *